Feb. 25, 1930. O. ATHENSTEDT 1,748,165
CONTROLLING APPARATUS FOR CENTRIFUGAL MACHINES
Filed Oct. 10, 1927 5 Sheets-Sheet 1

Inventor:
Otto Athenstedt,
by F. W. Dahn,
Attorney.

Patented Feb. 25, 1930

1,748,165

UNITED STATES PATENT OFFICE

OTTO ATHENSTEDT, OF EINBECK, GERMANY

CONTROLLING APPARATUS FOR CENTRIFUGAL MACHINES

Application filed October 10, 1927, Serial No. 225,203, and in Germany November 4, 1926.

My invention relates to improvements in controlling apparatus for centrifugal machines, and one of the objects of the improvements is to provide an apparatus for setting the discharge pipe of the centrifugal machine into different positions for delivering the liquid to different gutters or the like. My improved controlling apparatus may be used in connection with centrifugal machines used in the manufacture of sugar for delivering the liquid matter thrown from the centrifugal basket to different gutters, according to the requirements of the manufacture. Thus my improved apparatus may be used for delivering the molasses and the washing liquid or liquids to different gutters, or it may be used in the refining of sugar for delivering the liquid or liquids separated from the sugar being refined to different gutters. Another object of the improvements is to provide an apparatus by means of which predetermined amounts of two or more washing liquids may be supplied to the centrifugal basket in definite succession after separating the molasses from the sugar, the delivery pipe of the centrifugal machine being simultaneously set into position for delivering the said washing liquids to different gutters.

Finally, an object of the improvements is to provide automatic means for locking the gate controlling the supply of the charge of sugar to the basket in closed position, until the operation of the centrifugal machine has been finished, and the basket has been arrested, and for preventing the supply of the washing liquid or liquids to the basket before the charge of sugar has been filled into the same and the basket has been set to motion.

With these and other objects in view my invention consists in the matters to be described hereinafter and particularly pointed out in the appended claims.

For the purpose of explaining the invention several examples embodying the same have been shown in the accompanying drawings in which the same reference characters have been used in all the views to indicate corresponding parts. In said drawings, Fig. 2, is a diagrammatical view showing the controlling apparatus used in the system shown in Fig. 1, Fig. 3, is a somewhat diagrammatical elevation showing an electrically operated switch used in the apparatus shown in Fig. 2, Fig. 4, is an elevation showing a part of the controlling apparatus shown in Fig. 2 and looking in the direction of the arrows 4—4, Fig. 5, is a diagrammatical top plan view of Fig. 4 showing the controlling apparatus in a position different from that illustrated in Fig. 2, Fig. 6, is an elevation similar to the one shown in Fig. 1 and illustrating a modification, Fig. 7, is a partial plan view on an enlarged scale of the centrifugal machine showing the locking means for the basket.

Referring now to the example illustrated in Figs. 1 to 5, the parts of the sugar mill to which my invention relates consist of a mixer $a$ of any known or preferred form, a distributing apparatus $b$, and one or more centrifugal baskets $c$. To the mixer $a$ the sugar is supplied from the vacuum pans (not shown) and it is stirred therein for a suitable length of time before being supplied to the distributing apparatus $b$. The distributing apparatus $b$ is provided with a gate $d$ one for each of the baskets $c$, and the said gate or gates are adapted to be opened and closed by means of a hand operated lever $e$. The sugar discharged from the apparatus $b$ is delivered to the basket or baskets $c$ by means of a chute or gutter $d^1$. Within the said basket the molasses is drained from the sugar, the sugar being left within the basket, and the washing liquids and molasses being passed through a pipe $f$ and a valve $i$ to a gutter $g$. After thus separating the molasses from the sugar a washing liquid, steam, or the like is sprinkled on the sugar, and the said washing liquid is delivered through the pipe $f$ and the valve $i$ to a second gutter $h$. It appears therefore that the valve $i$ must be operated for connecting the pipe $f$ either with the gutter $g$ or with the gutter $h$, and the reversing of the valve $i$ from the position connecting the pipe $f$ with the gutter $g$ into the position for connecting the said pipe with the gutter $h$ must take place according to the conditions of the operation of the system either before or after supplying the washing liquid to the basket, while the opposite operation of the said valve for connecting the pipe $f$ with the gutter $g$ must take place when a new charge of sugar is supplied to the basket. For thus operating the valve $i$ an electromagnet $k$ is provided, which when energized lifts the valve cone $i^1$ into the position shown in Fig. 1 for connecting the pipe $f$ with the gutter $h$, a spring $k^1$ being provided for forcing the valve cone $i^1$ downwardly and into position for connecting the pipe $f$ with the gutter $g$. The washing liquid is supplied to the basket $c$ through a pipe $l$ connected with a suitable supply of washing liquid and including a controlling valve $m$, the valve cone $m^1$ of which is connected with an electromagnet $n$ and a spring $n^1$, the electromagnet being adapted to open the valve, and the spring $n^1$ tending to close the valve. The pipe $l$ is provided with a rockable delivery spout $l^1$, as is known in the art. The terminals of the electromagnets $n$ and $k$ are connected by leads 29, 30 and 17, 18 with terminals 3, 4 and 6, 7 of a controlling apparatus $o$, and the said controlling apparatus and terminals 5 and 6 of the said controlling apparatus are connected by leads 15, 16 with terminals 9, 10 of a switch $p$, the switch arm of the said switch being the aforesaid lever $e$ controlling the gate $d$ of the distributing apparatus $b$.

Figures 2, 3, 4, 5:
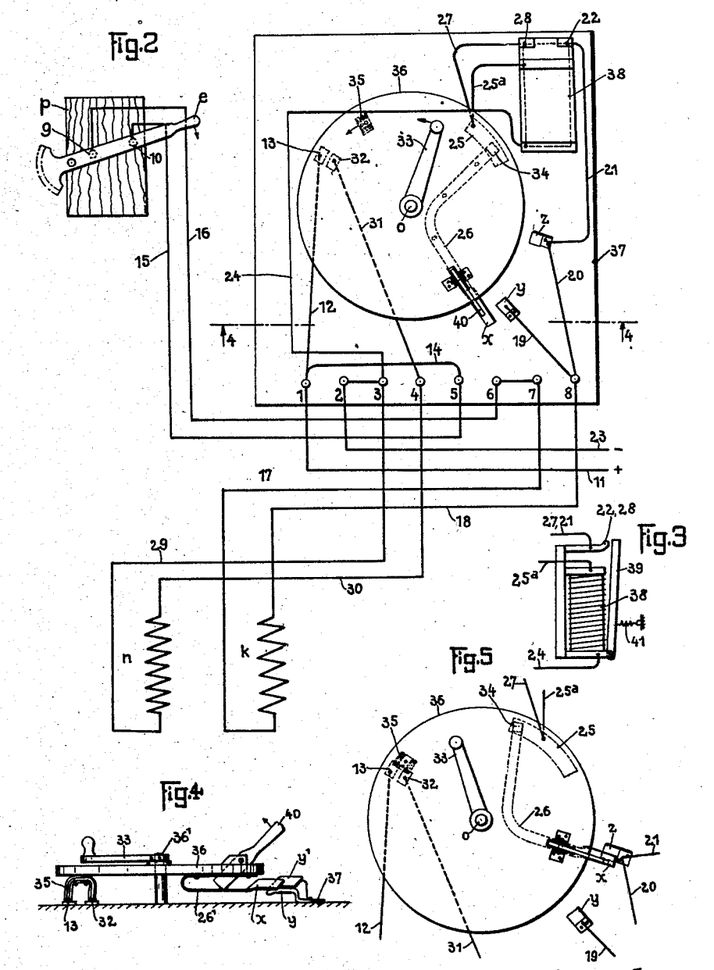

The controlling apparatus comprises a base plate 37 having five contact members 13, 32, 25, $z$ and $y$ fixed thereto, the contact member $y$ being in the form of a Z-shaped spring 19 fixed to the base plate 37, so that the contact making portion $y$ is elevated from the base plate 37, as is shown in Fig. 4. To the top face of the member $y$ an insulating plate $y^1$ is fixed. The contact members 13, 32, 25, $z$ and $y$ cooperate with bushes $x$, 34 and 35 mounted on a disk 36 fixed to a spindle $36^1$ rotatably mounted in the base plate 37 and carrying a hand operated crank 33. The brushes $x$ and 34 are electrically connected with each other by a lead 26 and a spring $26^1$ connected therewith, and the brush 35 comprises two arms adapted to bridge the contact members 13, 32. Normally the spring $26^1$ holds the brush $x$ in position above the contact member $y$ and the insulating plate $y^1$, as is shown in Fig. 4, and it is adapted to be depressed by a lever 40 rockingly mounted on the disk 36, into position for passing below the bottom face of the contact member $y$. The aforesaid terminals 3, 4, 5, 6, 7, 8 and terminals 1, 2 are mounted on the base plate 37. Further an electromagnetic switch 38 is mounted on the said base plate. The armature 39 of the said switch is adapted to connect contact members 28 and 22.

In addition to the leads 15, 16, 17, 18 and 29, 30 the following leads are provided: The terminals 1, 2 are connected by leads 11 and 23 with a source of electric energy. The terminal 1 is connected by leads 12 and 14 with the contact member 13 and the terminal 5 respectively, the terminal 2 is electrically connected with the terminal 3, the terminal 4 is connected by a lead 31 with the contact member 32, the terminals 6 and 7 are electrically connected with each other, and the terminal 8 is connected by leads 191 and 20 with the contact members $y$ and $z$ respectively. The contact member $z$ is connected by a lead 21 with the contact member 22, the contact member 28 is connected by a lead 27 with the contact member 25 and the electromagnetic switch 38 is connected by leads $25^a$ and 24 respectively with the contact member 25 and the terminal 3.

Before supplying the charge of sugar to the basket $c$ the parts, and more particularly the levers $e$ and 35 are in the positions shown in Fig. 2, and, the electromagnetic switch 38 holding the contact members 22 and 28 in engagement with each other, an electric current is supplied from the source of electric energy as follows: 11, 1, 14, 5, 15, 10, $e$, 9, 16, 6, 7, 17, $k$, 18, 8, 20, $z$, 21, 22, 39, 28, 27, 25, $25^a$, 38, 24, 3, 2, 23. Thus the electromagnet $k$ is energized, and it holds the valve cone $i^1$ in the position shown in Fig. 1, so that the pipe $f$ communicates with the gutter $h$.

Figure 1:
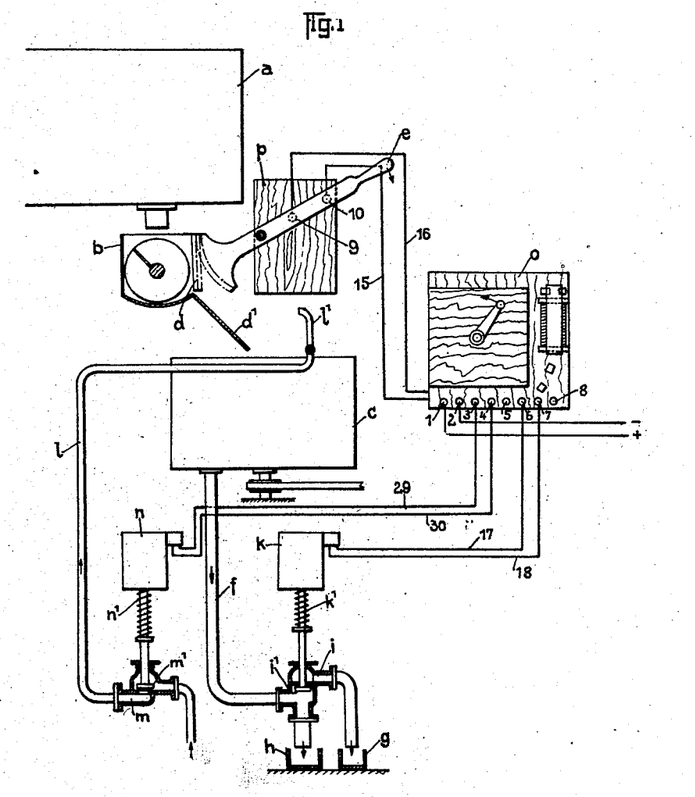
Fig. 1, is a diagrammatical view showing certain apparatus of a sugar mill to which my invention is applied.

For supplying a charge of sugar to the basket $c$ the lever $e$ is rocked downwardly. Thereby the gate $d$ is opened, and the electrical connection between the terminals 9 and 10 is broken and the aforesaid current is interrupted. Therefore the armature 39 of the electromagnetic switch 38 is retracted by a spring 41 from the contact members 22 and 28, and the spring $k^1$ forces the valve cone $i^1$ downwardly thus connecting the pipe $f$ within the gutter $g$.

After the basket $c$ has been filled the lever $e$ is again rocked upwardly. Thereby the gate $d$ of the distributing apparatus is closed, and the contact members 9, 10 are again electrically connected. The electromagnetic switch 38 is not affected.

After the molasses has been drained from the sugar, the spout $l^1$ is rocked into position for delivering washing liquid to the basket, and the crank 33 of the controlling apparatus $o$ is turned into the position shown in Fig. 5.

Thereby the brush 35 bridges the contact members 13 and 32, the brush $x$ passes below the contact member $y$ without making contact therewith and engages the contact member $z$. The brush 34 does not disengage the contact member 25, the latter being comparatively long. Now two electric currents flow from the source of electric current as follows: first, 11, 1, 12, 13, 35, 32, 31, 4, 30, $n$, 29, 3, 2, 23; and second, 11, 1, 14, 5, 15, 10, $e$, 9, 16, 6, 7, 17, $k$, 18, 8, 20, $z$, $x$, 26, 24, 25, 25$^a$, 38, 24, 3, 2, 23. By the supply of electric current to the first-named circuit the electromagnet $n$ is energized so that the valve $m$ is opened, and by the current flowing through the second circuit the electromagnet $k$ is energized, so that the valve $i$ is set into position for connecting the pipe $f$ with the gutter $h$. Further, the second circuit includes the electromagnet of the switch 38 which therefore attracts the armature 39 and closes the contacts 22 and 28. By closing the contacts 22, 28 the aforesaid circuits are not affected but a third circuit is closed the function of which will be described hereafter.

After the washing liquid has sufficiently acted on the charge of sugar contained within the basket $c$ the valve $m$ through which the washing liquid is supplied to the basket is again closed by turning the crank 33 of the controlling apparatus $o$ into initial position. When returning the controlling apparatus $o$ into initial position the brushes 35 and $x$ are removed from the contact members 13, 32 and $z$. Therefore the first one of the above-named circuits is broken between the said contact members 12 and 23, the electromagnet $n$ is deenergized, and the spring of the valve $m$ closes the water supply $l$. The breaking of the contact at $x$ and $z$ by returning the controlling apparatus $o$ into initial position does not affect the second circuit, because the branch circuit $z$, 21, 22, 39, 28, 27, 25 closed by the switch 38 replaces the open portion of the second circuit $z$, $x$, 26, 34, 25. Thus the electromagnet $k$ remains operative, until the operation of the centrifugal basket is finished and the said basket is emptied and a new charge of sugar is supplied thereto by depressing the hand lever $e$ of the switch $p$.

If it is desired to reverse the position of the valve $i$ for connecting the pipe $f$ with the gutter $h$ after the washing operation is finished, the lever 40 is set into position for permitting the brush $x$ to be lifted by the spring 26$^1$ into elevated position, as has been shown in Fig. 4. Preferably, the said lever is confined within a locked box.

If, with the lever 40 in the said rocked position, the controlling apparatus $o$ is turned by means of the crank 33 in the direction of the arrow shown in Fig. 2, after supplying a charge to the basket and starting rotation thereof, the brush 35 connects the contact members 13, 32, so that the first one of the above described circuits is closed by means of which the electromagnet $n$ of the valve $m$ is energized. The brush $x$ slides on the insulating plate $y^1$ covering the contact member $y$ without closing the circuit including the electromagnet $k$ of the valve $i$.

When returning the controlling apparatus $o$ at the end of the washing operation within the basket $c$ into the initial position shown in Fig. 2 the contacts 13, 32 and 35 are separated from each other, so that the first one of the above described circuits including the electromagnet $n$ is interrupted, and the water supply valve $m$ is closed. Simultaneously, when returning the controlling apparatus $o$ into the said initial position, the spring-pressed brush $x$ is passed for a short time on the bottom face of the contact member $y$ by reason of the inclined position thereof. Thus a circuit is closed from lead 11 over 1, 14, 5, 15, 10, $e$, 9, 16, 6, 7, 17, $k$, 18, 8, 19, $y$, $x$, 26, 34, 25, 25$^a$, 38, 24, 3, 2, and to the lead 23. Therefore the electromagnet $k$ sets the valve $i$ into position for connecting the pipe $f$ with the gutter $h$, and the electromagnet of the switch 38 attracts the armature 39, which therefore closes the contacts 22 and 28. After the brush $x$ has passed the contact member $y$ the circuit 11, 1, 14, 5, 15, 10, $e$, 9, 16, 6, 7, $k$, 18, 8, 20, $z$, 21, 22, 39, 28, 27, 25, 25$^a$, 38, 24, 3, 2, 23 remains closed, so that the electromagnet $k$ remains energized until a new charge of sugar is supplied to the basket $c$ and the contacts 9, 10 are separated by opening the gate $d$ of the distributing apparatus $b$ by means of the lever $e$.

In Figs. 6 to 9 I have shown a modification in which after the first operation of the centrifugal basket for removing the molasses, the charge of sugar is subject to two or more washing operations, the arrangement being such that predetermined amounts of washing liquids are supplied in definite succession, and that the said operations can not be repeated. According to each washing operation, the delivery pipe or the centrifugal machine is shifted for discharging the liquids to different gutters. Further, provision is made for locking the gate of the distributing chamber controlling the supply of the charge to the centrifugal basket until the centrifugal basket has completed its work and come to rest. Further, provision is made for preventing the supply of the washing liquids to the basket until after supplying the charge to the basket, the centrifugal machine has been unlocked and started its rotary movement.

Figures 6, 7:
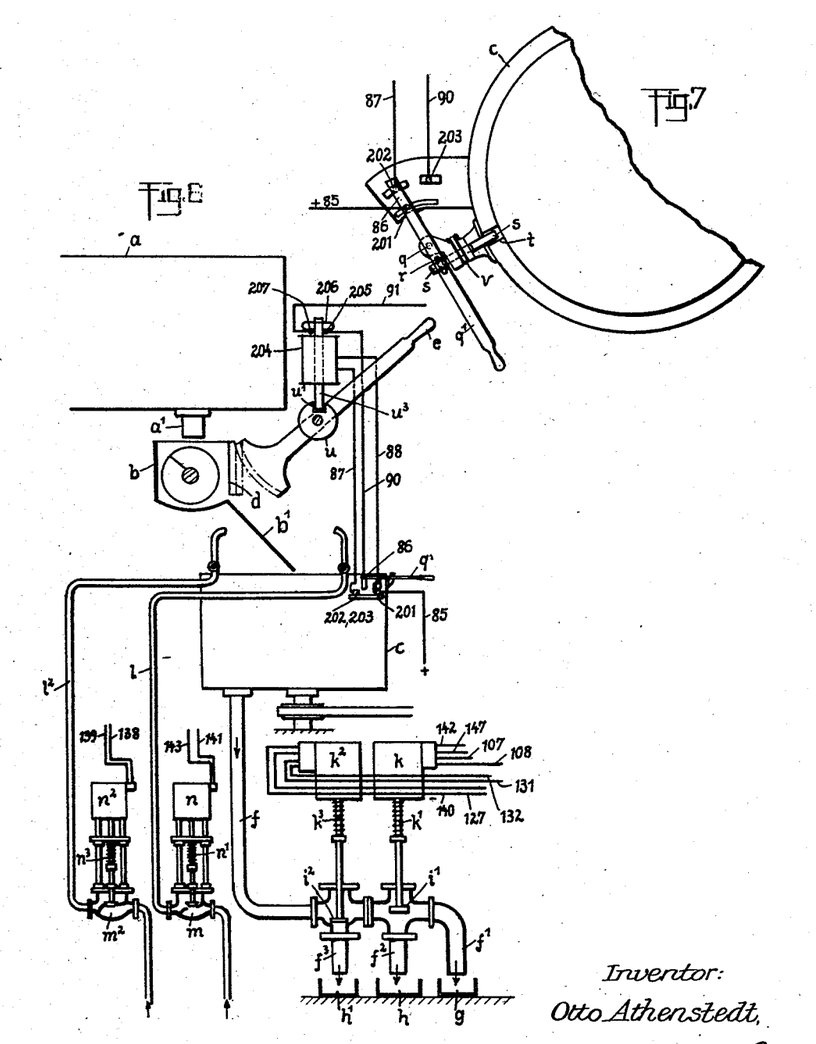
Figure 8:
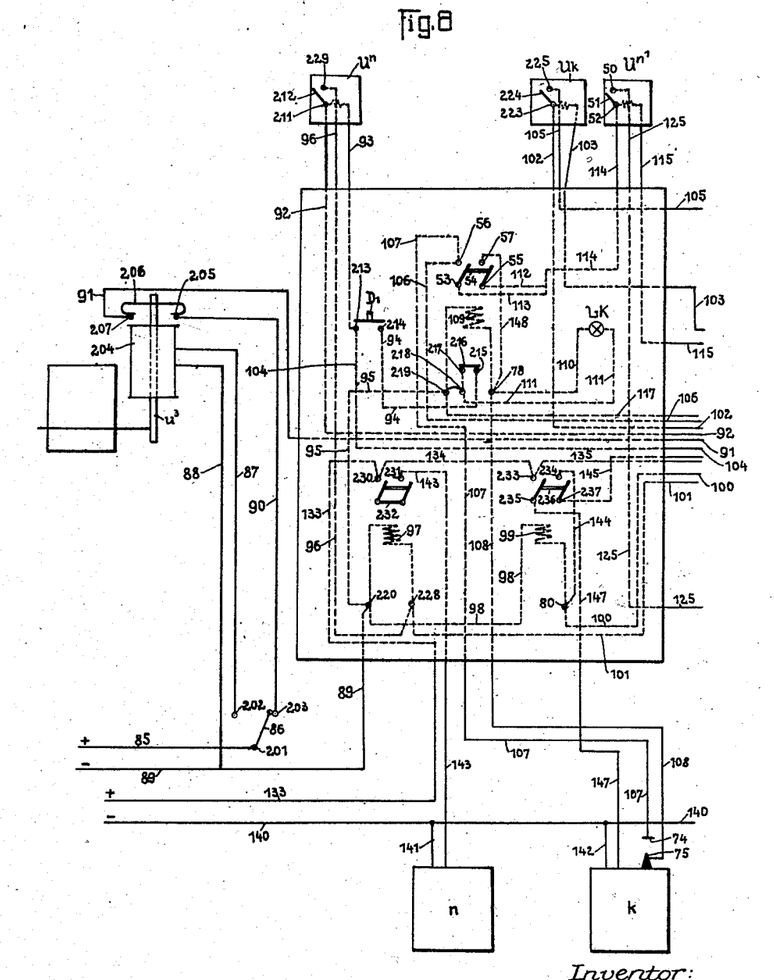
Fig. 8, is a diagram showing the left hand part of the controlling apparatus and its electrical connection in detail.
Figure 9:
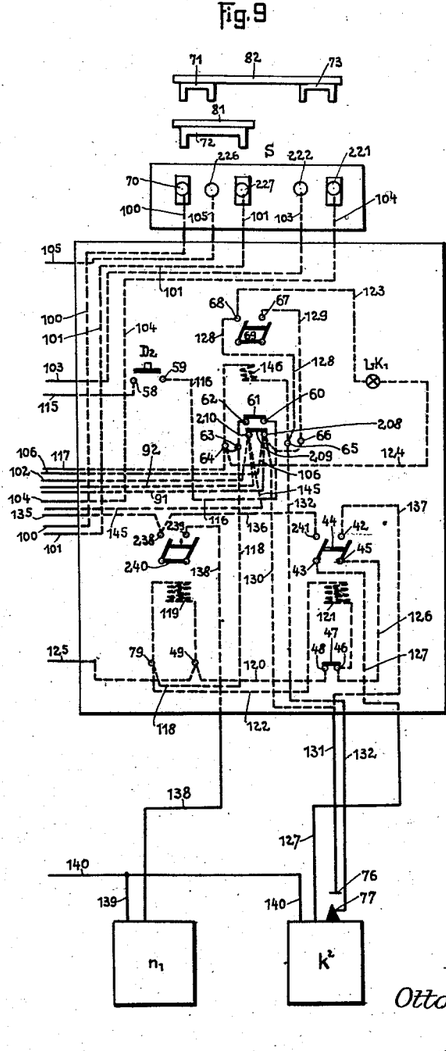
Fig. 9, is a similar diagram showing the right hand part of the said controlling apparatus and its electrical connections.

Referring now in detail to the said figures, and more particularly to Figs. 6 and 7, the charge of sugar is supplied from the mixer $a$ and through a delivery pipe $a^1$ into the distributing apparatus $b$ provided with a plurality of gates $d$ one for each of the centrifugal baskets $c$ cooperating therewith, the said gates being adapted to be elevated and lowered by means of the hand operated lever $e$. The charge of sugar is supplied to the centrifugal basket $c$ by means of a chute $b^1$. From the centrifugal machine $c$ the liquids are discharged through the pipe $f$ provided with three outlets $f^1$, $f^2$ and $f^3$ disposed respectively above the gutters $g$, $h$ and a third gutter $h^1$. The gutter $g$ is designed for receiving the molasses separated from the sugar by the first operation of the basket, and the gutters $h$, $h^1$ are designed to receive the washing liquids obtained by supplying a washing medium such as water, steam, or the like to the charge of sugar. If for example after separating the molasses from the charge of sugar by the first operation of the basket $c$, water is supplied to the sugar for washing the same, the first washing liquid delivered from the basket is supplied to the gutter $h$, and if thereafter steam is supplied to the basket, the second liquid thus obtained is supplied to the gutter $h^1$. The discharge of the liquids through the said outlets is controlled by the valve cone $i^1$ and a second valve cone $i^2$ by means of which the outlets $f^2$ and $f^3$ can be closed. The valve cones $i^1$ and $i^2$ are adapted to be operated by electromagnets $k$ and $k^2$, springs $k^1$, $k^3$ being provided for forcing the valve cones on their seats. When both valve cones $i^1$, $i^2$ are placed on their seats the outlet $f^1$ is open, and if thereafter the valve cone $i^1$ is unseated the liquid is discharged from the pipe $f$ through the outlet $f^2$ and into the gutter $h$. When unseating the valve cone $i^2$ the liquid is delivered through the outlet $f^3$ and into the gutter $h^1$. For supplying the washing liquids to the basket the pipe $l$ and a second pipe $l^2$ are provided, the pipe $l$ being connected to a supply of water, and the pipe $l^2$ having a supply of steam. In the pipes $l$ and $l^2$ valves $m$ and $m^2$ are included, which are adapted to be elevated by electromagnets $n$ and $n^2$, springs $n^1$ and $n^3$ tending to close the valves.

At the beginning of the operation of the centrifugal machine $c$ both valve cones $i^1$ and $i^2$ are in position for closing the outlets $f^2$ and $f^3$, so that the molasses is delivered through the outlet $f^1$. Before or after opening the valve $m$ for supplying the first washing liquid to the basket the valve cone $i^1$ is unseated so that the first washing liquid is discharged through the outlet $f^2$ and into the gutter $h$. Finally the valve cone $i^2$ is raised from its seat, after the valve $m^2$ has been opened for supplying the second washing medium through the pipe $l^2$.

On a vertical pivot bolt $q$ a hand operated lever $q^1$ is rockingly mounted the rear end 86 of which is in the form of a switch arm controlling three contact members 201, 202, 203 and adapted to connect the contact member 201 either with the member 202 or the member 203. The front part of the said lever $q^1$ is formed with a longitudinal slot $r$ engaged by a pin projecting downwardly from a locking bolt $s$ guided in the casing enclosing the centrifugal basket and adapted to engage a recess $t$ for locking the basket in position. The bolt $s$ is adapted to be locked in its end positions by means of a latch bolt $v$, the said latch bolt being adapted to be set into locking position by hand.

The hand lever $e$ controlling the gate $d$ of the distributing apparatus $b$ is connected with a disk $u$ formed with a recess $u^1$, and above the said disk there is an electromagnet 204 the core $u^3$ of which is adapted for locking engagement with the recess $u^1$ of the disk $u$. The electromagnet 204 is connected by leads 88 and 87 respectively with the contact member 202 and the negative current supply 89. The positive current supply 85 is connected to the contact member 201.

Before beginning the operation, the lever $q^1$ is in the position shown in Fig. 7, thus locking the centrifugal basket $c$ and connecting the contact members 201 and 202 by means of its rear end 86. Thus the following circuit is completed: source of electric energy 85, 201, 86, 202, 87, electromagnet 204, 88, 89, source of electric energy. Thus the electromagnet holds the armature $u^3$ in elevated position in which the disk $u$ is unlocked and the contacts 205 and 207 are interrupted. Now the hand lever $e$ is rocked in a direction for lifting the gate $d$, so that a charge of sugar is passed into the centrifugal basket. The gate $d$ is closed by rocking the lever $e$ upwardly into the position shown in Fig. 6. By shifting the lever $q^1$ and the arm 86 from the position shown in Fig. 7 in which the contact members 201 and 202 are connected for energizing the electromagnet 204 and the centrifugal basket $c$ is locked, into the position in which the contact members 201 and 203 are bridged and the basket $c$ is released, the circuit 85—201—202—87—204—88—89 is interrupted. Therefore the electromagnet 204 is deenergized thus allowing the core $u^3$ to drop and to lock the disk $u$ and the lever $e$ in position, so that the said lever can not be operated any more while the basket rotates. Further, a pair of contact members 205 and 207 are bridged by a contact spring 206 carried by the armature, thus completing a partial circuit 85—201—86—203—90—205—206—207—91—208—209—210—92—211—93—213, the said circuit including a push-button $D^1$, and being continued from 214 over 94—215—216—217—218—219—95—220—89. When depressing the push-button $D^1$ the said partial circuits are connected so as to complete the following circuit: (I) 85—201—86—203—90—205—206—207—91—208—209—210—92—211—93—213—$D^1$—214—94—215—216—217—218—219—95—220—89, the said circuit including a time switch $U^n$ the operation of which is thus started. If thereafter an arm 212 of the said time switch engages a contact 229, the following circuit is completed: (II) 85—201—86—203—90—205—206—207—91—208—209—210—92—211—212—229—96—228—101—227—72—70—100—99—98—220—89. The contact 228 is connected by a branch circuit (II$^a$) 228—97—220 with the negative current supply 89. The coils 97, 99 and the coils 109, 119, 121 and 146 referred to hereinafter are parts of relays adapted when energized to operate switches 232, 236, 54, 240, 44 and 69. Further, when energizing the coils 109, 121, 146 bridges 216, 47, 209 and 61 are retracted from contacts controlled thereby. By the circuit II completed by the time switch U$^n$ and the branch circuit II$^a$ the switch arms 232 and 236 are operated by reason of the supply of current to the coils 97 and 99. Thus the electromagnets $n$ and $k$ are connected to circuits III and IV: (III) 133—230—232—231—143—$n$—141—140 and (IV) 133—230—134—233—236—235—147—$k$—142—140. By means of the electromagnets $n$ and $k$ the valve $m$ for supplying water to the basket and the valve $i^1$ for delivering the liquid discharged from the basket through the pipe $f, f^2$ and into the gutter $h$ are opened.

If after a certain period of time which has been exactly set beforehand, the arm 212 of the time switch U$^n$ leaves the contact 229 the circuit II$^a$ including the relay 97 is interrupted, and the switch arm 232 is moved by a spring into the former position shown in the drawing.

By the arm 212 leaving the contact 229 the circuit II is interrupted. But the switch arm 236 is not returned into initial position because the coil 99 is further energized by the circuit (II$^b$) 85—201—86—203—90—205—206—207—91—208—209—210—145—237—236—234—144—80—99—98—220—89. This circuit II$^b$ is afterwards interrupted when the second washing medium is supplied to the basket.

In the elevated position the electromagnet $k$ lifting the valve $i^1$ closes, by means of contacts 74 and 75, a circuit (V) 85—201—86—203—90—205—206—207—91—208—106—56—107—74—75—108—78—109—219—95—220—89.

Further, a current is supplied from contact 78 over contact 110 through a signalling lamp LK, and lead 111 over contact members 218 and 219 to the negative lead 89. By the said lamp circuit V$^a$: 78—110—LK—111—218—219 the attendant is advised that the first washing liquid is being supplied to the basket. By energizing the coil 109 the bridge 216 is lifted and the switch arm 54 reversed. By lifting the bridge 216 the circuit I is interrupted between the contact members 215 and 217, so that a second operation of the push-button D$^1$ would be ineffective. By reversing the switch 54 the current is supplied to the circuit V up to contact 56 and from thence over 54—53—113—114—52—115 to the left hand contact 58 of the push-button D$^2$, so that the second push-button D$^2$ can be depressed after the signal LK has become visible.

If the valve cone $i^1$ is to be operated by the electromagnet $k$ after the liquid contained within the pipe $f$ has been completely delivered, the electromagnets $n$ and $k$ should not simultaneously become operative after depressing the push-button D$^1$, but the electromagnet $k$ must become operative prior to the electromagnet $n$ sufficiently for permitting the said liquid to flow out of the outlet $f^1$. Automatic means are provided for regulating this succession of the operations of the said electromagnets, which means consist of a second time switch U$^k$ the function and period of operation of which can be regulated, and which supplies electric energy to the electromagnet $k$ only at the desired moment. For retarding the operation of the electromagnet $k$ a hand operated switch S is provided, which is provided with five contact members 70, 226, 227, 222 and 221. If it is not desired to retard the said operation a plug 81 is put into the switch S, said plug connecting the contact members 70 and 227 by a bridge 72.

For retarding the operation the plug 81 is removed and replaced by a plug 82 provided with two bridges 71 and 73 adapted to connect the contacts 221, 222 and the contacts 226, 70 respectively.

Even after reversing the switch S by means of the plug 82 the circuit I is again closed and the time switch U$^n$ started by depressing the push-button D$^1$. When the arm 212 makes contact with the contact 229 the coil of the relay 97 is energized by the circuit II$^a$, the contacts 220 and 228 being respectively connected to the positive and negative leads 85 and 89, so that the electromagnet $n$ is energized by current flowing through the circuit III.

After depressing the push-button switch D$^1$, and inserting the plug 82 into the switch S, the retarding switch U$^k$ is set into operation by means of the circuit (VI) 85—201—86—203—90—205—206—207—91—208—209—210—102—223—103—222—73—221—104—213—D$^1$—214—94—215—216—217—218—219—95—220—89. When the arm 224 of the said switch U$^k$ engages the contact 225 the circuit (VII) 85—201—86—203—90—205—206—207—91—208—209—210—102—223—224—225—105—226—71—70—100—80—99—98—220—89 is closed. By supplying current to the coil 99 and operating the switch arm 236 the circuit IV including the electromagnet $k$ is closed. By including the time switch U$^k$ in the circuit in lieu of the time switch U$^n$ the operation of the electromagnet $k$ is delayed. When energizing the electromagnet $k$ operating the valve $i^1$ the contacts 74 and 75 close the circuit V, by means of which the lamp circuit V$^a$ is switched in, and current is supplied to the circuit V to the contact 56, over 54—53—113—114—52—115 to the left hand contact 58 of the push-button switch D$^2$. Now the push-button switch D$^2$ can be operated. If thereafter the switch arm 224 leaves the contact 225 the circuit VII is again interrupted. Thus the supply of current to the circuit IV is interrupted. But the electromagnet $k$ remains energized, and the valve $i^1$ remains in elevated position, because the circuit II$^b$ is still closed.

By depressing the push-button switch D$^2$ the following branch circuits VIII$^a$ and VIII$^b$ are connected into a circuit VIII: (VIII$^a$) 85—201—86—203—90—205—206—207—91—208—106—56—54—53—113—114—52—115—58 and (VIII$^b$) 59—116—60—62—63—64—117—219—95—220—89, and (VIII) 85—201—86—203—90—205—206—207—91—208—106—56—54—53—113—114—52—115—58—D$^2$—59—116—60—61—62—63—64—117—219—95—220—89. By the said circuit another time switch U$^{n1}$ is thrown into operation until the arm 51 engages the contact 50, thus closing the circuit (IX) 85—201—86—203—90—205—206—207—91—208—106—56—54—53—113—114—52—51—50—125—49—119—79—118—63—64—117—219—95—220—89.

From the contact 49 a circuit IX$^a$ is branched off, which is connected with the negative current supply 89: (IX$^a$) 49—120—48—47—46—121—122—79—118—63—64—117—219—95—220—89. By energizing the coils 119 and 121 the switch arms 240 and 44 are operated, and the contact 46—47—48 is interrupted. The switch arms 240 and 44 throw the circuits X and XI into operation, so that the electromagnets $n^1$ and $k^2$ are energized by means of which the valve $m^2$ for supplying steam to the centrifugal basket and the valve $i^2$ are lifted, the said circuits being as follows: (X) 133—230—134—233—135—238—240—239—138—$n^1$—139—140, and (XI) 133—230—134—233—135—238—136—241—44—127—$k^1$—140. When being energized the electromagnet $k^2$ closes a circuit XII at the contacts 76 and 77: (XII) 85—201—86—203—90—205—206—207—91—208—130—131—76—77—132—65—146—64—117—219—95—220—89. From the contact 65 of the said circuit XII a circuit XIII is branched off, which is connected over 128—68—123—LK$^1$—124 with the contact 64. By the said branch circuit the lamp LK$^1$ is illuminated showing to the attendant that the second washing medium is being supplied to the centrifugal basket. By the circuit XII the coil 146 of a relay is energized, by means of which the switch 69 is operated, and the connection between the contacts 60—61—62 and 208—209—210 is interrupted. If the arm 51 of the time switch U$^{n1}$ leaves the contact 50 the circuits IX and IX$^a$ are interrupted. The coil 119 is deenergized, and the switch arm 240 is rocked into initial position, while current is still supplied to coil 121 through a branch circuit (IX$^b$) 85—201—86—203—90—205—206—207—91—208—130—137—42—44—45—126—46—121—122—79—118—63—64—117—219—95—220—89. By the breaking of the contacts 60—61—62 the circuit VIII which before was closed by depressing the push-button switch D$^2$, is disconnected from the current supply, so that repeated depressing of the switch D$^2$ is ineffective.

Since also the contacts 208—210 are separated by the bridge 209, the branch circuit II$^b$ is opened. The coil 99 is deenergized, and therefore the circuit IV supplying current to the electromagnet $k$ is disconnected from the current supply. The valve $i^1$ is seated by the spring $k^2$, and further, the contacts 74—75 are separated, and the circuit V broken. However, the coil 109 remains operative by being included in the branch circuit (V$^b$) 85—201—86—203—90—205—206—207—91—208—106—56—54—53—113—112—55—54—57—148—78—109—219—95—220—89. Even when depressing the push-button switch D$^1$ no effect is produced because the coil 109 is still energized.

At the end of the operation of the centrifugal basket the circuit XII is interrupted by operating the hand lever $q^1$, and pressing the locking bolt $s$ thereof into engagement with the recess $t$ of the centrifugal basket. The rear end 86 of the lever $q^1$ is shifted from contact 203 into engagement with contact 202. Thus the electromagnet 204 is energized, and its core $u^3$ is retracted from the notch $u^1$ of the disk $u$, so that the gate $d$ can be moved upwardly for permitting another charge of sugar to pass into the centrifugal basket $c$.

I claim:

1. The combination, with a centrifugal machine having a supply means for the charge to said machine, a supply means for a treating medium, and discharging means, a plurality of containers for receiving matter separated from the charge, means for opening and closing said supply means for the charge, electromagnetic means for opening and closing said supply means of a treating medium, electromagnetic means for causing said discharging means to discharge into any one of said containers, two switches electrically connected with each other and cooperating for controlling the current supply to said electromagnets and one operatively connected with said means for opening and closing said supply means for the charge.

2. The combination, with a centrifugal machine having a supply means for the charge to said machine, a supply means for a treating medium, and discharging means, a plurality of containers for receiving matter separated from the charge, means for opening and closing said supply means for the charge, electromagnet means for opening and closing said supply means of a treating medium, electromagnetic means for causing said discharging means to discharge into any one of said containers, two switches electrically connected with each other and cooperating for controlling the current supply to said electromagnets and one operatively connected with said means for opening and closing said supply means for the charge and the other one being a multiple switch connected with an automatic circuit making device.

3. The combination, with a centrifugal machine having a supply means for the charge, a supply means for a treating medium, and discharging means, of a plurality of containers for receiving matter separated from the charge through said discharging means, means for opening and closing said supply means for the charge, means for opening and closing said supply means for a treating medium, means for causing said discharging means to discharge into any one of said containers, operating means for said means for opening and closing said supply means for a treating medium and said means controlling said discharging means, locking means for said centrifugal machine operatively connected with said operating means, and locking means for said means for opening and closing said supply means for the charge adapted when in non-locking position to prevent operation of said operating means by said locking means for said centrifugal machine.

4. Apparatus as claimed in claim 3, in which a plurality of supply means for treating media are provided, and in which the means for opening the supply for the treating medium and for operating the discharge are dependent upon each other so that the said supply means for the treating media are opened in predetermined succession.

5. Apparatus as claimed in claim 3, in which the apparatus for opening the supply means for the washing media and for operating the discharge of the centrifugal machine are dependent upon one another so that by the operation of one of the apparatus the other apparatus is brought into position ready for operation, while the first-named apparatus is locked by the operation of the second apparatus.

6. Apparatus as claimed in claim 3, comprising electric operating means, in which the circuits for opening the supply means for washing liquids and for operating the discharge include time switches controlling the periods of time the supply means for the washing liquids are opened.

7. Apparatus as claimed in claim 3 in which a plurality of supply means for treating media are provided, and in which the means for opening the supply means for the treating medium and for operating the discharge are dependent upon each other so that the said supply means for the treating media are opened in predetermined succession, and in which the apparatus for opening the supply means for the washing media and for operating the discharge of the centrifugal machine are dependent upon one another so that by the operation of one of the apparatus the other apparatus is brought into position ready for operation, while the first-named apparatus is locked by the operation of the second apparatus.

8. Apparatus as claimed in claim 3, in which a plurality of supply means for treating media are provided and in which the means for opening the supply means for the treating medium and for operating the discharge are dependent upon each other so that the said supply means for the treating media are opened in predetermined succession, and comprising electric operating means, in which the circuits for opening the supply means for washing liquids and for operating the discharge include time switches controlling the periods of time the supplies for the washing liquids are opened.

9. In combination, a centrifugal machine having a supply means for the charge, a supply means for a treating medium, and discharging means, of a plurality of containers for receiving matter separated from the charge, means for controlling the supply means, the treating medium and the discharge means comprising electrically interlocked means for shifting the discharge means from cooperation with one of said containers to cooperate with another of said containers dependent upon the position of the supply means for the charge.

10. In combination with a centrifugal machine, of means controlling the supply of the charge to said machine, electrically controlled means controlling the supply of a treating medium to said machine, electrically controlled means controlling the discharge of material from said machine into any one of a plurality of containers selectively, a closure for the basket of said machine, an electric controller cooperating with said closure, supply controlling means and said electrically controlled means and electrically connected therewith whereby to prevent opening the charge supply while the closure is closed and ensure selective control of the discharge means.

11. In combination with a centrifugal machine, means controlling the supply of the charge to said machine, means for controlling the supply of a treating medium, means for discharging material separated from the charge and a plurality of containers for receiving said separated material, said discharge means comprising electromagnetically controlled valves for each container, said supply controlling means being electrically interlocked with the valve control means whereby the relative positions of the valve are dependent upon the position of the supply control means.

12. In combination with a centrifugal machine, means controlling the supply of the charge to said machine, electromagnetically controlled means controlling the supply of a treating medium to said machine, electromagnetically controlled means controlling the discharge of material from said machine into any one of a plurality of containers selectively, said electromagnetically controlled means being electrically interlocked with said supply controlling means whereby the position of said latter means controls the operation of said electromagnetically controlled means.

13. The combination with a centrifugal machine, of means for controlling the supply for the charge, means controlling the supply for a treating medium, a plurality of containers for receiving matter discharged from said machine, discharging means, and means for causing said discharging means to discharge into said containers in succession and to control the supply of the treating medium, all said means being electrically interlocked, and selective means to change the order of succession of the operation of the discharge means and the means controlling the supply of the treating medium.

In testimony whereof I have affixed my signature.

OTTO ATHENSTEDT.